US 7,375,302 B2

(12) United States Patent
Twarog et al.

(10) Patent No.: US 7,375,302 B2
(45) Date of Patent: *May 20, 2008

(54) PLASMA ARC TORCH HAVING AN ELECTRODE WITH INTERNAL PASSAGES

(75) Inventors: Peter J. Twarog, West Lebanon, NH (US); Charles M. Hackett, Hanover, NH (US); David J. Cook, Bradford, NH (US); Bruce P. Altobelli, Hanover, NH (US); David L. Bouthillier, Hartford, VT (US)

(73) Assignee: Hypertherm, Inc., Hanover, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/989,729

(22) Filed: Nov. 16, 2004

(65) Prior Publication Data

US 2006/0102598 A1   May 18, 2006

(51) Int. Cl.
*B23K 9/00* (2006.01)
*B23K 10/00* (2006.01)

(52) U.S. Cl. .................. 219/121.52; 219/121.48; 219/121.53; 219/121.54; 219/121.55; 219/121.59

(58) Field of Classification Search .......... 219/121.39, 219/121.43, 121.44, 121.48, 121.5, 121.52, 219/121.59

See application file for complete search history.

(56) References Cited

U.S. PATENT DOCUMENTS 3,004,189 A    10/1961  Giannini et al.
3,562,486 A *  2/1971   Hatch et al. ............ 219/121.45
4,692,584 A *  9/1987   Caneer, Jr. ............. 219/121.55
4,782,210 A    11/1988  Nelson et al. ......... 219/121.52
4,902,871 A    2/1990   Sanders et al. ........ 219/121.49
5,070,227 A    12/1991  Luo et al. .............. 219/121.55
5,101,088 A    3/1992   Andersson et al.
5,124,525 A *  6/1992   Severance et al. ....... 219/121.5
5,132,512 A    7/1992   Sanders et al. .......... 219/121.5
5,164,568 A    11/1992  Sanders .................... 219/121.5
5,170,033 A    12/1992  Couch, Jr. et al. ...... 219/121.51
5,214,262 A    5/1993   Carkhuff ................. 219/121.48

(Continued)

FOREIGN PATENT DOCUMENTS

EP    1154678 A1    11/2001

(Continued)

OTHER PUBLICATIONS

International Search Report for PCT/US2005/039743, date of mailing Dec. 5, 2006 (25 pages).

*Primary Examiner*—Tu Ba Hoang
*Assistant Examiner*—Stephen J. Ralis
(74) *Attorney, Agent, or Firm*—Proskauer Rose, LLP

(57) ABSTRACT

An electrode for a plasma arc cutting torch which minimizes the deposition of high emissivity material on the nozzle, reduces electrode wear, and improves cut quality. The electrode has a body having a first end, a second end in a spaced relationship relative to the first end, and an outer surface extending from the first end to the second end. The body has an end face disposed at the second end. The electrode also includes at least one passage extending from a first opening in the body to a second opening in the end face.

30 Claims, 14 Drawing Sheets

U.S. PATENT DOCUMENTS

| | | |
|---|---|---|
| 5,225,657 A | 7/1993 | Blankenship et al. |
| 5,296,668 A | 3/1994 | Foreman et al. ....... 219/121.48 |
| 5,304,770 A | 4/1994 | Takabayashi et al. |
| 5,451,739 A | 9/1995 | Nemchinsky et al. .. 219/121.51 |
| 5,514,848 A | 5/1996 | Ross et al. ............. 219/121.52 |
| 5,695,662 A | 12/1997 | Couch, Jr. et al. ...... 219/121.39 |
| 5,900,168 A * | 5/1999 | Saio et al. ............. 219/121.44 |
| 5,908,567 A * | 6/1999 | Sakuragi et al. ........ 219/121.52 |
| 5,977,510 A | 11/1999 | Lindsay ................... 219/121.5 |
| 6,011,238 A * | 1/2000 | Bertez et al. .......... 219/121.48 |
| 6,207,923 B1 | 3/2001 | Lindsay ................... 219/121.5 |
| 6,362,450 B1 | 3/2002 | Severance, Jr. .......... 219/121.5 |
| 6,403,915 B1 | 6/2002 | Cook et al. ............ 219/121.52 |
| 6,452,130 B1 * | 9/2002 | Qian et al. ............. 219/121.52 |
| 6,649,860 B2 * | 11/2003 | Kawachi et al. ....... 219/121.36 |
| 6,657,153 B2 * | 12/2003 | McBennett et al. .... 219/121.52 |
| 6,777,638 B2 | 8/2004 | Nemchinsky et al. |
| 6,841,754 B2 * | 1/2005 | Cook et al. ............ 219/121.48 |
| 2002/0125224 A1 | 9/2002 | Cook et al. ............ 219/121.48 |
| 2005/0082263 A1 | 4/2005 | Koike et al. ............ 219/121.49 |

FOREIGN PATENT DOCUMENTS

| | | |
|---|---|---|
| JP | 01150477 * | 6/1999 |
| WO | WO 03/089179 | 10/2003 |
| WO | WO 03/089180 | 10/2003 |
| WO | WO 03/089182 | 10/2003 |

* cited by examiner

PLASMA ARC TORCH HAVING AN ELECTRODE WITH INTERNAL PASSAGES

FIELD OF THE INVENTION

The invention generally relates to the field of plasma arc torch systems and processes. In particular, the invention relates to an improved electrode for use in a plasma arc torch and a method of manufacturing such electrode.

BACKGROUND OF THE INVENTION

Material processing apparatus, such as plasma arc torches and lasers are widely used in the cutting of metallic materials. A plasma arc torch generally includes a torch body, an electrode mounted within the body, a nozzle with a central exit orifice, electrical connections, passages for cooling and arc control fluids, a swirl ring to control the fluid flow patterns, and a power supply. Gases used in the torch can be non-reactive (e.g., argon or nitrogen), or reactive (e.g., oxygen or air). The torch produces a plasma arc, which is a constricted ionized jet of a plasma gas with high temperature and high momentum.

Plasma arc cutting torches produce a transferred plasma arc with a current density that is typically in the range of 20,000 to 40,000 amperes/in$^2$. High definition torches are characterized by narrower jets with higher current densities, typically about 60,000 amperes/in$^2$. High definition torches produce a narrow cut kerf and a square cut angle. Such torches have a thinner heat affected zone and are more effective in producing a dross free cut and blowing away molten metal.

In the process of plasma arc cutting of a metallic workpiece, a pilot arc is first generated between the electrode (cathode) and the nozzle (anode). The pilot arc ionizes gas passing through the nozzle exit orifice. After the ionized gas reduces the electrical resistance between the electrode and the workpiece, the arc then transfers from the nozzle to the workpiece. The torch is operated in the transferred plasma arc mode, characterized by the conductive flow of ionized gas from the electrode to the workpiece, for the cutting of the workpiece.

In a plasma arc torch using a reactive plasma gas, it is common to use a copper electrode with an insert of high thermionic emissivity material. The insert is press fit into the bottom end of the electrode so that an end face of the insert, which defines an emission surface, is exposed. The exposed surface of the insert is coplanar with the end face of the electrode. The end face of the electrode is typically planar, but in some cases can have, for example, an ellipsoidal, paraboloidal, spherical or frustoconical shape. The insert is typically made of hafnium or zirconium and is cylindrically shaped. The emission surface is typically planar.

In all plasma arc torches, particularly those using a reactive plasma gas, the electrode shows wear over time in the form of a generally concave pit at the exposed emission surface of the insert. The pit is formed due to the ejection of molten emissivity material from the insert. The emission surface liquefies when the arc is first generated, and electrons are emitted from a molten pool of high emissivity material during the steady state of the arc. However, the molten material is ejected from the emission surface during the three stages of torch operation: (1) starting the arc, (2) steady state of the arc, and (3) stopping the arc. A significant amount of the material deposits on the inside surface of the nozzle as well as the nozzle orifice.

Deposition of high emissivity material on the inside surface of the nozzle during the plasma arc start and stop stages is addressed by U.S. Pat. Nos. 5,070,227 and 5,166,494, commonly assigned to Hypertherm, Inc. in Hanover, N.H. It has been found that the heretofore unsolved problem of high emissivity material deposition during the steady state of the arc not only reduces electrode life but also causes nozzle wear.

The nozzle for a plasma arc torch is typically made of copper for good electrical and thermal conductivity. The nozzle is designed to conduct a short duration, low current pilot arc. As such, a common cause of nozzle wear is undesired arc attachment to the nozzle, which melts the copper usually at the nozzle orifice.

Double arcing, i.e., an arc that jumps from the electrode to the nozzle and then from the nozzle to the workpiece, results in undesired arc attachment. Double arcing has many known causes and results in increased nozzle wear and/or nozzle failure. The deposition of high emissivity insert material on the nozzle also causes double arcing and shortens the nozzle life.

SUMMARY OF THE INVENTION

It is therefore a principal object of this invention to reduce the nozzle wear by minimizing the deposition of high emissivity material on the nozzle during the cutting process.

Another principal object of the invention is to reduce the electrode wear by minimizing the ejection of molten emissivity material from the electrode insert.

Another principal object of the invention is to provide an electrode for a plasma arc torch that increases the axial momentum of the plasma arc column, promoting faster and better cutting performance.

Another principal object of the invention is to provide an electrode for a plasma arc torch that results in an improved cut quality.

Yet another principal object of the invention is to maintain the electrode life while reducing nozzle wear.

The present invention features, in one aspect, an improved electrode for a plasma arc cutting torch which minimizes the deposition of high emissivity material on the nozzle. In another aspect, the invention reduces electrode wear by minimizing the ejection of molten emissivity material from the electrode insert. In another aspect, the electrode increases the axial momentum of the plasma arc column, promoting faster and better cutting performance.

The invention, in one embodiment, features an electrode for a plasma arc torch. The electrode includes a body having a first end, a second end in a spaced relationship relative to the first end, and an outer surface extending from the first end to the second end. The body has an end face disposed at the second end of the body. The electrode also includes at least one passage extending from a first opening in the body to a second opening in the end face.

The second opening can be adjacent to the bore in the body of the electrode. The end face of the second end of the body can be transverse to a longitudinal axis of the body. The second end of the body of the electrode can include an ellipsoidal, paraboloidal, spherical or frustoconical shape. The body of the electrode can be an elongated body. The body of the electrode can be a high thermal conductivity material, such as copper.

The at least one passage of the electrode can be located at an angle (e.g., oblique or acute) relative to a longitudinal axis of the body. The at least one passage of the electrode can be parallel to a longitudinal axis of the body of the electrode.

The first opening in the body can be in the outer surface of the body or in an end face of the first end of the body. The at least one passage can direct a gas flow from the first opening towards the second opening in the second end. The at least one passage can direct a gas flow from the first opening radially and axially towards the second opening. The at least one passage can direct a gas flow radially from the first opening towards a longitudinal axis of the body and axially towards the second opening. In one embodiment, the at least one passage imparts a tangential velocity component to the gas flow out of the passages. In another embodiment, the at least one passage directs a gas flow from the first opening radially, axially, and/or tangentially towards the second opening. The gas flow exiting the second opening can be a swirling flow.

The electrode can include an insert formed of high thermionic emissivity material (e.g., hafnium) located within a bore disposed in the second end of the body, wherein an end face of the insert is located adjacent the second opening. The second end of the body can include an outer edge and a recessed region located between the outer edge and the end face of the insert. The second opening can be located in the recessed region.

The electrode can include a cap that is located at the second end of the body, wherein the at least one passage is defined by the cap and the body. The body of the electrode can include a flange that is located at the second end of the body. The first and second openings can be in the flange. The body of the electrode can include at least two components that form the at least one passage when the at least two components are assembled. The at least two components can be assembled by an assembly method, such as by brazing, soldering, welding or bonding. The at least two components can include mating threads.

The electrode can include a plurality of passages. The plurality of passages can each extend from a respective first opening in the body of the electrode to a respective second opening in the second end of the body of the electrode. The plurality of passages can be mutually equally angularly spaced around a diameter of the body of the electrode. The end face of the second end of the body can include a recess. The second opening can be located in the recess.

In another embodiment of the invention, an electrode features a body having a first end and a second end in a spaced relationship relative to the first end. The body has an end face disposed at the second end of the body. The electrode also includes at least one passage extending through the body. The at least one passage is dimensioned and configured to direct a gas flow that enters a first opening adjacent the second end of the body and exits a second opening in the end face of the second end of the body.

In another embodiment of the invention, an electrode includes a body defining a longitudinal axis extending from a first end of the body to a second end of the body, the body having an end face disposed at the second end. The electrode also includes at least one passage formed in the body extending from a first opening in the body to a second opening in the body. The second opening imparts at least an axial velocity component to a gas flow out of the at least one passage. The electrode also can include an insert formed of high thermionic emissivity material located within a bore disposed in the second end of the body. An end face of the insert can be located adjacent to the second opening.

In another embodiment of the invention, an electrode includes a body having a first end, a second end in a spaced relationship relative to the first end, and an outer surface extending from the first end to the second end. The body has an end face disposed at the second end. The electrode also includes at least one axially and radially directed passage formed in the body that extends from a first opening in the outer surface of the body to a second opening in the end face of the second end of the body. The second opening can be adjacent to a bore in the second end of the body of the electrode.

In another embodiment of the invention, an electrode includes a body having a first end, a second end in a spaced relationship relative to the first end, and an outer surface extending from the first end to the second end. The body defines a bore disposed in the second end of the body. The electrode also includes at least one passage that extends from a first opening in the body to a second opening adjacent the bore in the second end of the body.

In general, in another embodiment the invention relates to a method for fabricating an electrode for a plasma arc torch according to one aspect of the invention. The method involves forming a body that has a first end, a second end in a spaced relationship relative to the first end, and an outer surface extending from the first end to the second end. The body has an end face disposed at the second end. The method also involves forming at least one passage that extends from a first opening in the body to a second opening in the end face. The second opening can be adjacent to a bore in the second end of the body of the electrode.

The second end of the electrode can be located in an end face of the second end of the body. The body of the electrode can be a high thermal conductivity material, such as copper. The at least one passage can be located at an angle (e.g., oblique or acute) relative to a longitudinal axis of the body. The first opening can be located in the outer surface of the body. The at least one passage can be formed by brazing, soldering, welding or bonding at least two components. The at least one passage can be formed by joining at least two components, where the two components have mating threads. The at least one passage can be formed by assembling a cap and the body of the electrode.

The method for fabricating an electrode can include forming an insert of high thermionic emissivity material (e.g., hafnium) and inserting the insert into a bore disposed in the second end of the body.

In another embodiment of the invention, an electrode includes a body having a first end, a second end in a spaced relationship relative to the first end, and an outer surface extending from the first end to the second end. The body has an end face disposed at the second end. The electrode also includes a means for directing a gas flow from an opening in the end face at the second end of the body.

In another aspect, the present invention features a plasma arc torch for marking or cutting a workpiece. The torch includes a torch body that has a plasma flow path for directing a plasma gas to a plasma chamber in which a plasma arc is formed. The torch also includes an electrode mounted in the torch body. The electrode includes an electrode body that has a first end, a second end in a spaced relationship relative to the first end, and an outer surface extending from the first end to the second end. The electrode body of the electrode has an end face disposed at the second end of the electrode body. The electrode also includes at least one passage that extends from a first opening in the electrode body to a second opening in the end face at the second end of the electrode body. The second opening can be adjacent to a bore in the body of the electrode.

The torch can include a nozzle mounted relative to the electrode in the torch body to define the plasma chamber. The at least one passage can be located at an angle (e.g., oblique or acute) relative to a longitudinal axis of the body of the electrode. The at least one passage can direct a gas flow from the first opening towards the second opening. The torch can include an insert formed of high thermionic emissivity material (e.g., hafnium) located within a bore disposed in the second end of the electrode body, wherein an end face of the insert can be located adjacent the second opening.

The torch can include a cap located at the second end of the electrode body of the electrode, wherein the at least one passage is defined by the cap and the electrode body. The body of the electrode can include at least two components that form the at least one passage when the at least two components are assembled.

The electrode of the torch can include a plurality of passages. The plurality of passages can be mutually equally angularly spaced around a diameter of the body of the electrode. The plurality of passages can each extend from a respective first opening in the body of the electrode to a respective second opening in the second end of the body of the electrode. The torch can include a gas source for supplying a flow of gas (e.g., at least one of oxygen, air, hydrogen, argon, methane, carbon dioxide or nitrogen) to the plurality of passages.

In another aspect, the present invention features a plasma arc torch for marking or cutting a workpiece. The torch includes a torch body that has a plasma flow path for directing a plasma gas to a plasma chamber in which a plasma arc is formed. The torch also includes an electrode mounted in the torch body. The electrode includes an electrode body that has a first end, a second end in a spaced relationship relative to the first end, and an outer surface extending from the first end to the second end. The electrode body has an end face disposed at the second end of the electrode body. The torch also includes a component mounted in the torch body defining at least one passage. The passage has a first opening and second opening. The second opening imparts an axial velocity component to a gas flow out of the second opening of the at least one passage. The electrode can include an insert formed of high thermionic emissivity material located within a bore disposed in the second end of the electrode body. An end face of the insert can be located adjacent to the second opening of the at least one passage.

In another aspect, the present invention features a plasma arc torch for marking or cutting a workpiece. The torch includes a torch body that has a plasma flow path for directing a plasma gas to a plasma chamber in which a plasma arc is formed. The torch also includes an electrode mounted in the torch body. The electrode includes an electrode body that has a first end, a second end in a spaced relationship relative to the first end, and an outer surface extending from the first end to the second end. The electrode body has an end face disposed at the second end of the electrode body. The torch also includes a component mounted in the torch body defining at least one passage. The passage has a first opening and second opening. The passage directs a flow of gas that exits the second opening adjacent the second end of the electrode body.

In another aspect, the present invention features an assembly for use in a plasma arc torch for marking or cutting a workpiece. The assembly includes a nozzle mounted relative to an electrode in a torch body. The assembly also includes a component mounted relative to the nozzle, the component defining at least one passage, the at least one passage having a first and second opening, and the at least one passage directing a flow of gas exiting the second opening adjacent an insert in the electrode. The at least one passage can be a tapered orifice.

In another aspect, the present invention features a torch tip for a plasma arc torch. The plasma arc torch has a hollow torch body that includes a plasma chamber in which a plasma arc is formed. The torch tip includes an electrode having an electrode body having a first end, a second end in a spaced relationship relative to the first end, and an outer surface extending from the first end to the second end. The electrode body has an end faced disposed at the second end of the electrode body. The electrode also includes at least one passage that extends from a first opening in the electrode body to a second opening in the end face at the second end of the electrode body. The second opening can be adjacent to the bore in the body of the electrode. The torch tip also includes a nozzle mounted relative to the electrode in the torch body to define the plasma chamber. The torch tip can include a shield.

The foregoing and other objects, aspects, features, and advantages of the invention will become more apparent from the following description and from the claims.

BRIEF DESCRIPTION OF THE DRAWINGS

The foregoing and other objects, feature and advantages of the invention, as well as the invention itself, will be more fully understood from the following illustrative description, when read together with the accompanying drawings which are not necessarily to scale.

DETAILED DESCRIPTION OF ILLUSTRATIVE EMBODIMENTS

Figure 1:
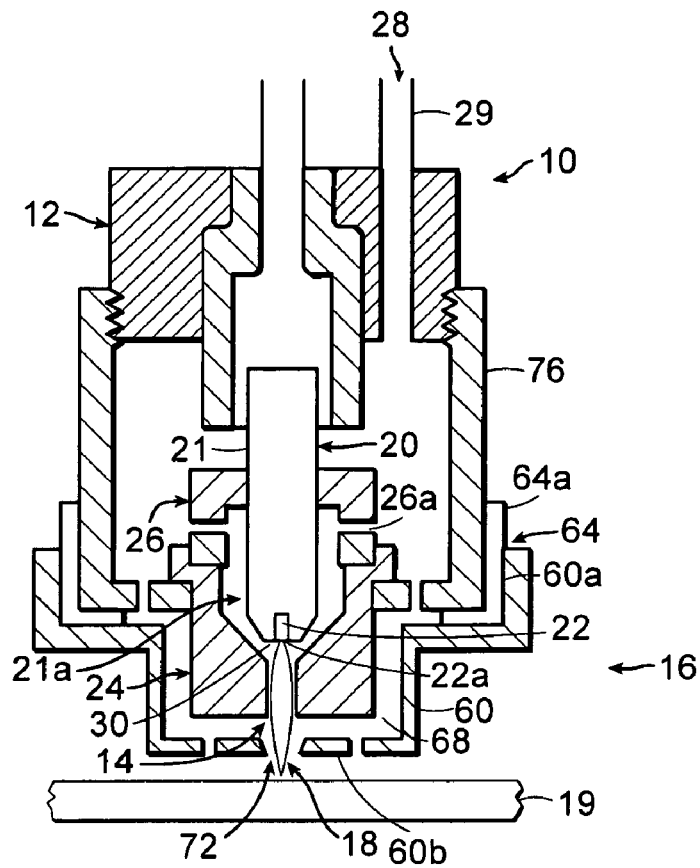
FIG. 1 is a cross-sectional view of an illustration of a conventional plasma arc cutting torch.

FIG. 1 illustrates in simplified schematic form of a typical plasma arc cutting torch 10 representative of any of a variety of models of torches sold by Hypertherm, Inc., with offices in Hanover, N.H. The torch 10 has a body 12 that is typically cylindrical with an exit orifice 14 at a lower end 16. A plasma arc 18, i.e., an ionized gas jet, passes through the exit orifice 14 and attaches to a workpiece 19 being cut. The torch 10 is designed to pierce and cut metal, particularly mild steel, or other materials in a transferred arc mode. In cutting mild steel, the torch 10 operates with a reactive gas, such as oxygen or air, as the plasma gas 28 to form the transferred plasma arc 18.

The torch body 12 supports a copper electrode 20 having a generally cylindrical body 21. A hafnium insert 22 is press fit into the lower end 21a of the electrode 20 so that a planar emission surface 22a is exposed. The torch body 12 also supports a nozzle 24 which is spaced from the electrode 20. The nozzle 24 has a central orifice that defines the exit orifice 14. A swirl ring 26 mounted to the torch body 12 has a set of radially offset (or canted) gas distribution holes 26a that impart a tangential velocity component to the plasma gas flow causing it to swirl. This swirl creates a vortex that constricts the arc 18 and stabilizes the position of the arc 18 on the insert 22. The torch also has a shield 60. The shield 60 is coupled (e.g., threaded at its upper side wall 60a to an insulating ring 64. The insulating ring 64 is coupled (e.g., threaded) at its upper side wall 64a to a cap 76 that is threaded on to the torch body 12. The shield 60 is configured so that it is spaced from the nozzle 24 to define a gas flow passage 68. A front face 60b of the shield 60 has an exit orifice 72 aligned with the nozzle exit orifice 14.

In operation, the plasma gas 28 flows through a gas inlet tube 29 and the gas distribution holes 26a in the swirl ring 26. From there, the plasma gas 28 flows into the plasma chamber 30 and out of the torch 10 through the exit orifice 14 and exit orifice 72. A pilot arc is first generated between the electrode 20 and the nozzle 24. The pilot arc ionizes the gas passing through the nozzle exit orifice 14 and the shield exist orifice 72. The arc then transfers from the nozzle 24 to the workpiece 19 for cutting the workpiece 19. It is noted that the particular construction details of the torch 10, including the arrangement of components, directing of gas and cooling fluid flows, and providing electrical connections can take a wide variety of forms.

Figure 2A:
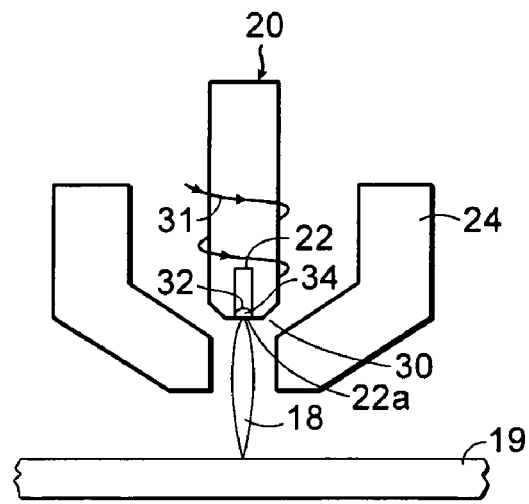
FIG. 2A is a partial cross-sectional view of the torch of FIG. 1 illustrating the concave shape of the emissive surface of the electrode insert created during operation of the torch.

Referring to FIG. 2A, it has been discovered that during operation of a conventional plasma arc torch, for example, the torch 10 of FIG. 1, the plasma arc 18 and a swirling gas flow 31 in the plasma chamber 30 actually force the shape of the emissive surface 32 of the hafnium insert 22 to be generally concave at steady state. Because the emissive surface 22a has a generally planar initial shape in a conventional torch, molten hafnium is ejected from the insert 22 during operation of the torch until the emission surface 22a has the generally concave shape. Thus, the shape of the emission surface 22a of the insert 22 changes rapidly until reaching the forced concave shape at steady state. The result is a pit 34 being formed in the insert 22.

It has been determined that the curvature of the concave shaped surface 32 is a function of the current level of the torch, the diameter (A) of the insert 22 and the pattern of the swirling gas flow 31 in the plasma chamber 30 of the torch 10. Thus, increasing the current level for a constant insert diameter results in the emission surface 22a having a deeper concave shaped pit. Similarly, increasing the diameter of the hafnium insert 22 or the swirl strength of the gas flow 31 while maintaining a constant current level results in a deeper concave shape.

The swirling gas flow 32 over the emission surface 32 of the hafnium insert 22 results, generally, in molten hafnium being ejected from the insert 22. The corresponding pit created in the insert 22 can result in deterioration in cut quality and ultimately the end of the consumable's service life. It is generally desirable to reduce the consumption of the hafnium insert (i.e., ejection of molten hafnium) to prolong the consumable life.

Figure 2B:
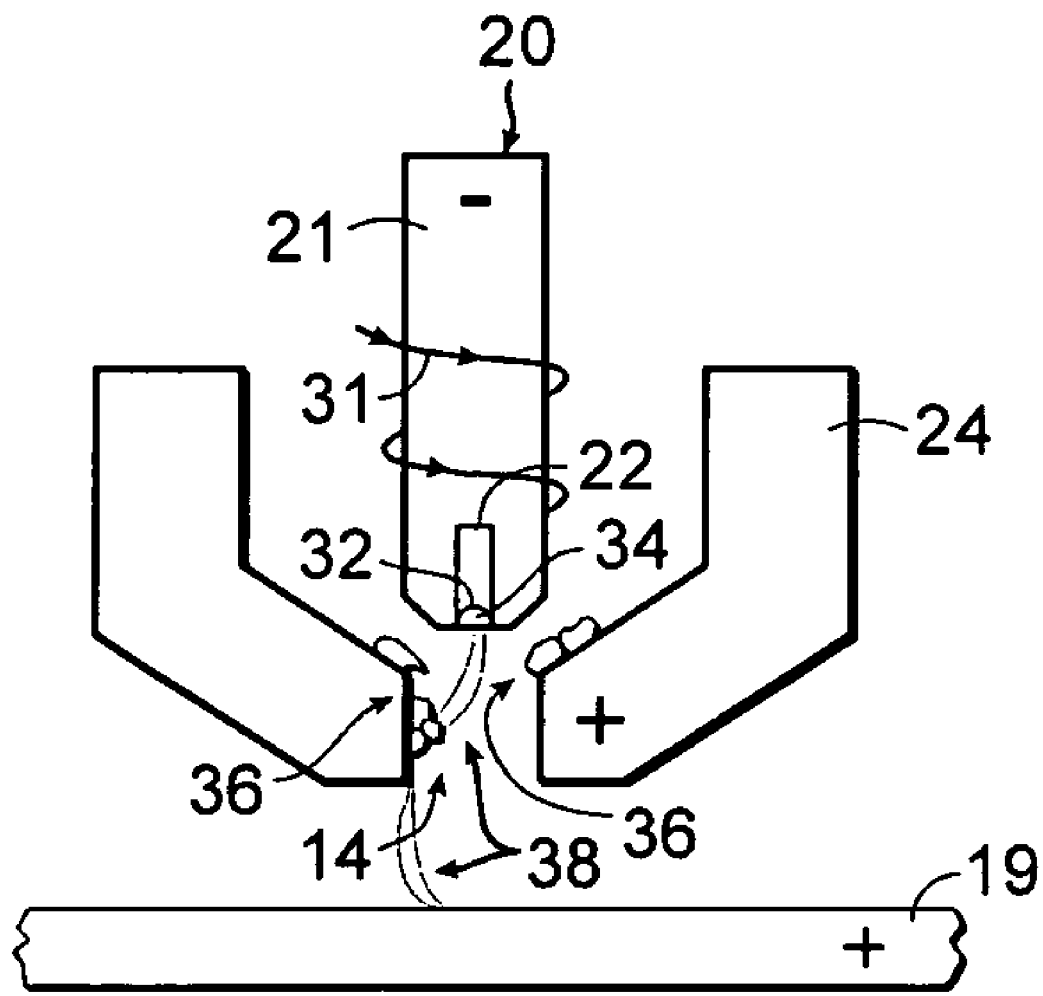
FIG. 2B is a partial cross-sectional view of the torch of FIG. 1 illustrating double arcing and nozzle wear caused by deposition of the electrode insert material on the nozzle during operation of the torch.

Referring to FIG. 2B, it has also been discovered that molten hafnium 36 ejected from the insert 22 during operation of the torch 10 is deposited onto the nozzle 24 causing a double arc 38 which damages the edge of the nozzle orifice 14 and increases nozzle wear and pitting of the emission surface of the hafnium insert 22. After pilot arc transfer, the nozzle 24 is normally insulated from the plasma arc by a layer of cold gas. However, this insulation is broken by molten hafnium being ejected into the gas layer, causing the nozzle 24 to become an easier path for the transferred plasma arc. The result is double arcing 38 as shown.

Figure 3B:
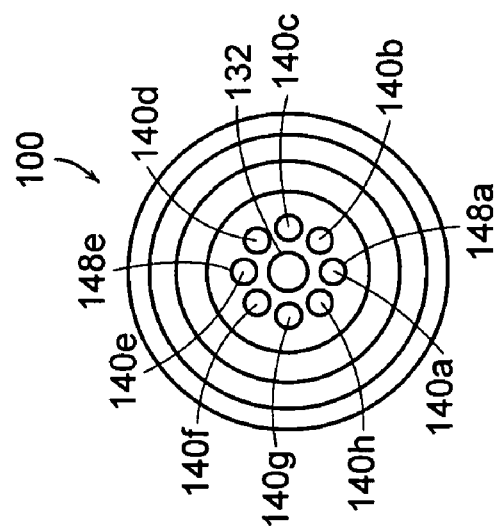
FIG. 3B is an end-view of the electrode of FIG. 3A.
Figure 3A:
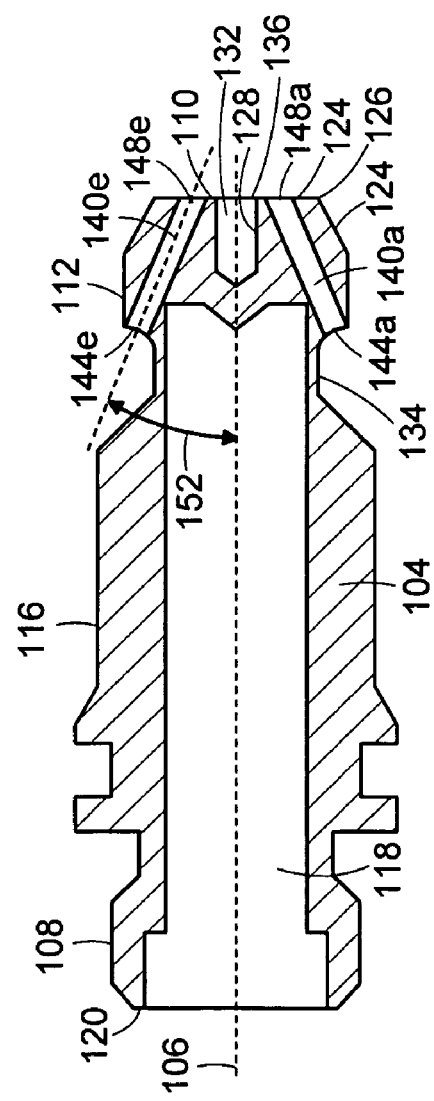
FIG. 3A is a cross-sectional view of an electrode, according to an illustrative embodiment of the invention.

In accordance with the present invention, an improved electrode 100 for a plasma arc cutting torch reduces electrode wear and minimizes the deposition of electrode insert material (e.g., hafnium) onto a nozzle. FIGS. 3A and 3B illustrate one embodiment of an electrode 100 incorporating the principles of the invention. The electrode 100 has a generally cylindrical elongated body 104 formed of a high thermal conductivity material such as copper. The electrode body 104 extends along a longitudinal axis 106 of the electrode 100, which is common to the torch (not shown) when the electrode 100 is installed therein. The electrode 100 has a hollow interior 118 that extends along the longitudinal axis 106 of the electrode 100. The electrode body 104 has a first end 108 and a second end 112 and an outer surface 116 that lies between the first end 108 and the second end 112. The first end 108 has an end face 120 that defines a planar surface that is transverse to the longitudinal axis 106 of the electrode 100. The second end 112 has an end face 124 that defines a planar surface 110 that is transverse to the longitudinal axis 106 of the electrode 100. In this embodiment, the end face 124 has a generally frustoconical shape. Alternatively, the second end 112 and/or end face 124 may have a different shape, for example, an ellipsoidal, paraboloidal or spherical shape.

A bore 128 is formed in the second end 112 of the electrode body 104 along the longitudinal axis 106 of the electrode 100. A generally cylindrical insert 132 formed of a high thermionic emissivity material (e.g., hafnium) is press fit into the bore 128. An emission surface 136 of the insert 132 is located within the bore 128 such that an end face defined by the emission surface 136 is generally coplanar with the planar surface 110 of the end face 124 of the second end 112 of the electrode body 104. The end face 124 has an edge 126. The edge 126 may, for example, have a radius or a sharp edge. In this embodiment, the electrode body 104 also has a groove 134 (e.g., an annular recess) that extends around an outer diameter of the second end 112 of the body 104 of the electrode 100.

As shown, the electrode 100 has multiple (e.g., eight) passages 140a, 140b, 140c, 140d, 140e, 140f, 140g, 140h (generally 140) that extend through the body 104 of the electrode 100. Each passage 140 has a respective first opening (generally 144) located in the groove 134. Each passage 140 also has a respective second opening (generally 148). For example, the passage 140a has a first opening 144a located in the groove 134 of the second end 112 of the body 104 and a second opening 148a located in the end face 124 of the second end 112 of the body 112. The second opening 148a is located adjacent the emission surface 136 of the insert 132. The passages 140 are capable of directing a gas flow from respective first openings 144 towards the second openings 148. The second openings 148 impart at least an axial velocity component to the gas flow exiting the passages 140. In some embodiments, the first opening 144 of the passages 140 is located partially within the groove 134. In some embodiments, the first opening 144 is not located within the groove 134. In some embodiments, the electrode 100 lacks a groove 134.

The gas flow directed through the passages 140 may be, for example, a plasma gas such as oxygen or air. Alternatively, the gas flow may be a flow of one or more gases (e.g., oxygen, air, hydrogen and nitrogen, argon, methane and carbon dioxide). The gas may be supplied by the same source of gas used to provide the plasma gas for creating the transferred plasma arc in operation. In some embodiments, an alternative source of gas provides the gas flow to the passages 140 via, for example, one or more hoses or conduits, or passages in the torch to the first openings 144.

It has been determined that oxidizing gases (e.g., air or oxygen) in the vicinity of the electrode (e.g., emission surface 136 of the insert 132) contribute to poor electrode 100 life, particularly during starting of the torch. Accordingly, in some embodiments, alternative non-reactive gases (e.g., nitrogen) or gases containing a combination of oxidizing and non-oxidizing gases are instead directed through the passages 140 to improve electrode 100 life by reducing the percent of oxidizing gas (e.g., plasma gas) in the region of the insert 132. In one embodiment, a valve (not shown) controls the flow of a non-oxidizing gas (e.g., nitrogen) through the passages 140. In one embodiment, the gas is directed through the passages to coincide with initiating and/or extinguishing the plasma arc. The second openings 148 of the passages 140 impart a substantially axial (i.e., along the longitudinal axis 106) velocity component to the gas exiting the second openings 148. In some embodiments, the control of the flow of gas is timed to coincide with, for example, one or more of the current delivered to the torch, an increase or decrease in plasma gas pressure, initiating the plasma arc, and extinguishing the plasma arc.

The passages 140 are located at an angle 152 (e.g., an acute or oblique angle) relative to the longitudinal axis 106 of the electrode 100. The angle 152, the number of passages 140 and the diameter of the passages 140 may be selected to, for example, reduce the swirl strength of the plasma gas in the region of the arc emitted from the emission surface 136 of the insert 132. Reducing the swirl strength, for example, decreases the ejection of molten emissivity material from the insert 132 because the axial velocity component of the gas flow out of the passages 140 reduces the aerodynamic forces acting on the insert 132. By way of example, the angle 152, the number of passages 140, and the diameter of the passages 140 may be selected as a function of the operating current level of the torch, diameter of the insert 132 and the plasma gas flow pattern and/or strength in the torch. In some embodiments, the passages 140 are located parallel to the longitudinal axis 106 of the electrode 100.

By way of illustration, an experiment was conducted to demonstrate the reduction of wear in the emission surface of the insert of an electrode. Eight passages 140 were formed in the body of the electrode, for example, the electrode 100 of FIGS. 3A and 3B. The passages each had a diameter of about 1.04 mm located at an angle 152 of about 22° relative to the longitudinal axis 106 of the electrode 100. In operation in a torch, for equivalent operating conditions, an electrode employing the passages exhibited less wear in the emissive surface than the electrode without passages.

Alternative numbers and geometries of passages 140 are within the scope of the invention. By way of example, the passages 140a may have a circular, ellipsoidal, otherwise curved, or rectilinear cross-sectional shape, for example, when viewed from the end-view orientation of FIG. 3B. In some embodiments, however, the passages 140 are oriented to also impart a tangential velocity component to the gas flow out of the passages 140 causing a swirling flow. In this manner, the passages 140 are capable of directing a flow of gas from the second openings 148 that has axial, radial, and tangential velocity components. The passages 140 may be oriented, for example, similarly to the passages in a swirl ring (e.g., radially offset or canted) to impart a tangential velocity component to the gas flow.

Figure 4:
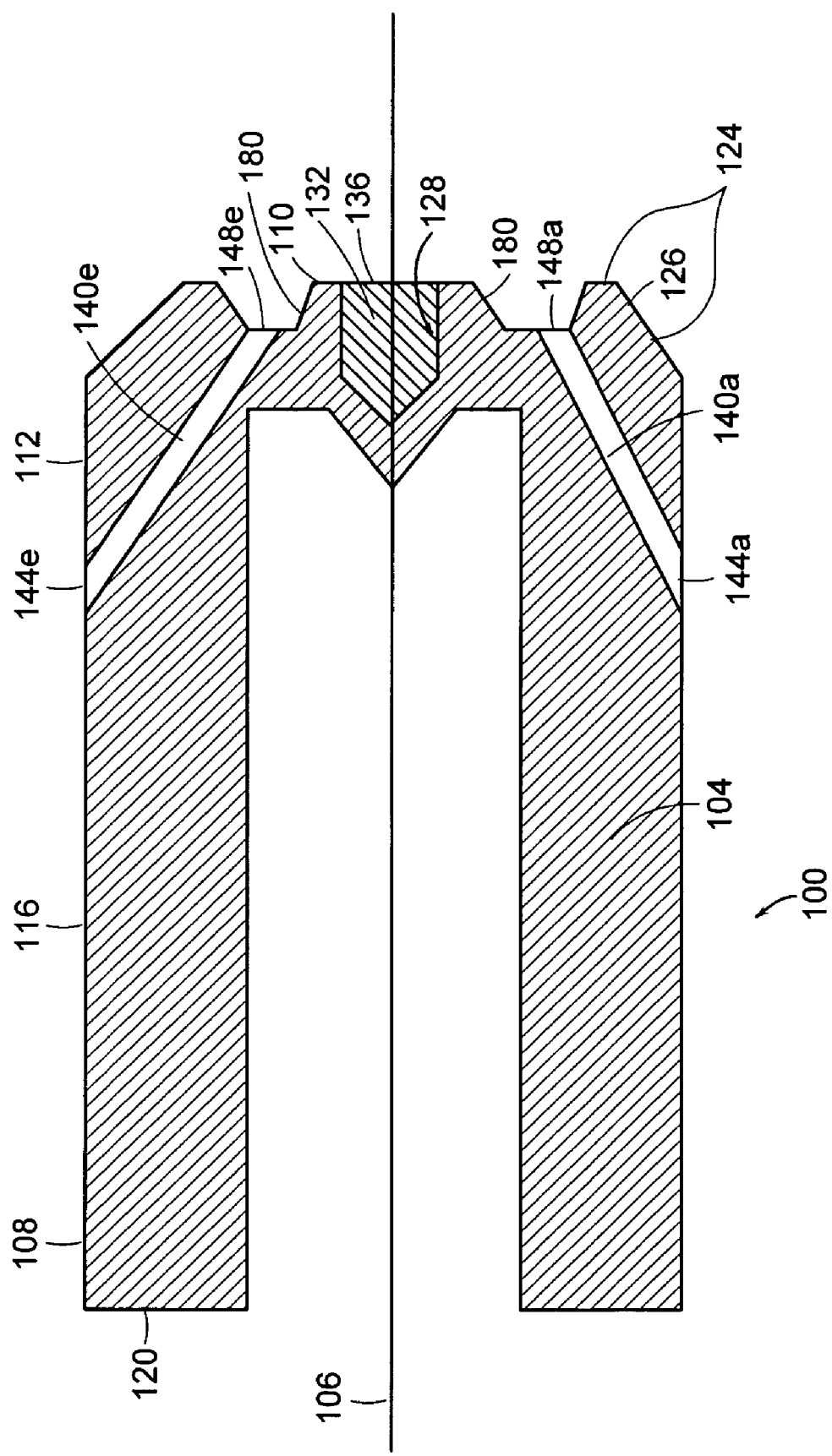
FIG. 4 is a cross-sectional view of an electrode, according to an illustrative embodiment of the invention.

In another embodiment of the invention, illustrated in FIG. 4, the electrode 100 has a plurality of passages 140 (140a and 140e shown; 140b, 140c, 140d, 140f, 140g, and 140h not shown). The body 104 of the electrode 100 has an annular recessed region 180 in the end face 124 of the second end 112 of the body 104. The passages 140 each extend from respective first openings 144 in the outer surface 116 of the body 104 to respective second openings 148 in the recess 180 of the end face 124 of the second end 112 of the body 104.

Figure 5:
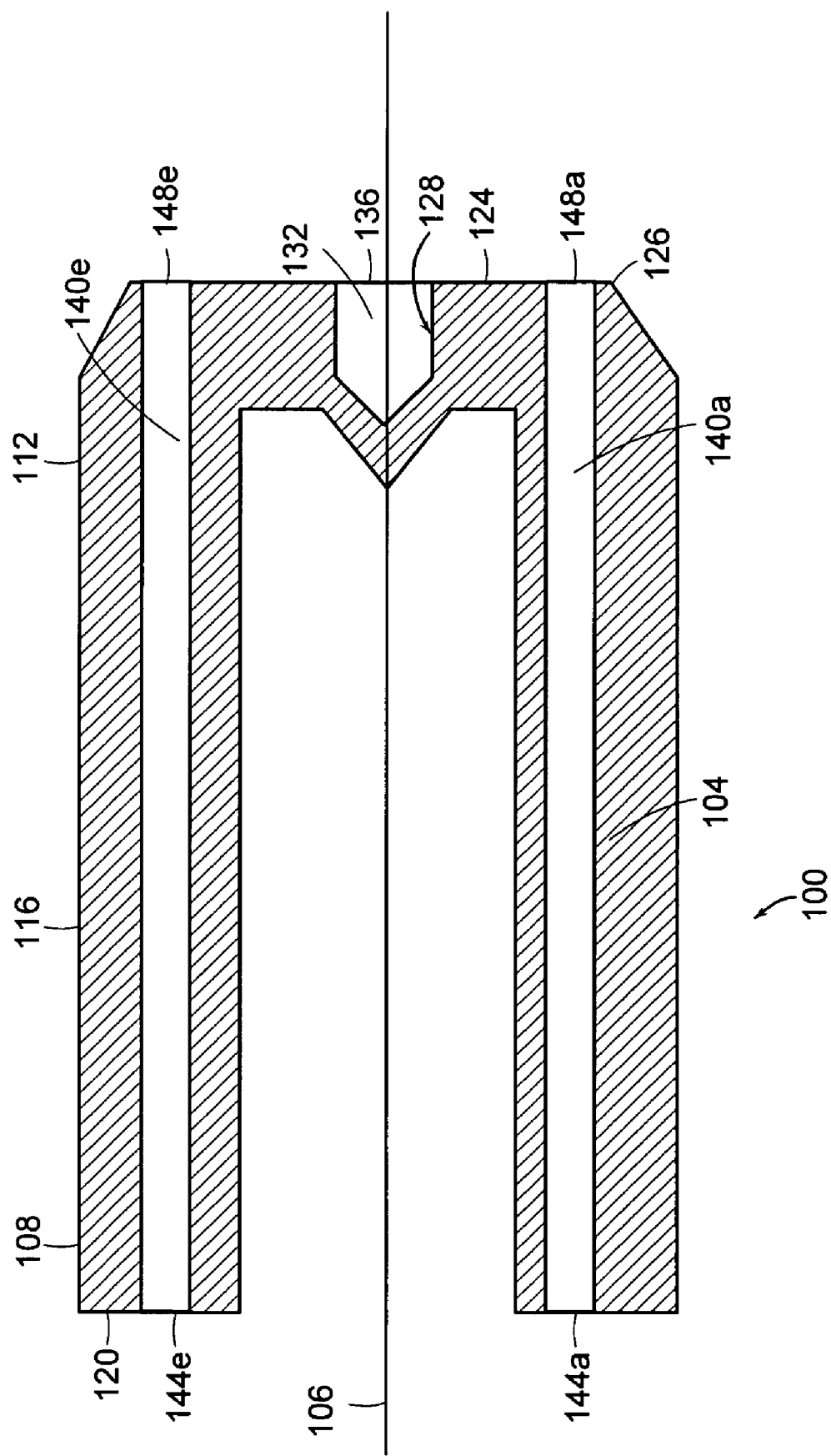
FIG. 5 is a cross-sectional view of an electrode, according to an illustrative embodiment of the invention.

In another embodiment of the invention, illustrated in FIG. 5, the electrode 100 has a plurality of passages 140 (140a and 140e shown; 140b, 140c, 140d, 140f, 140g, and 140h not shown). The passages 140 each extend from respective first openings 144 in an end face 120 of the first end 108 of the body 104 of the electrode 100 to respective second openings 148 in the end face 124 of the second end 112 of the body 104. The second openings 148 are located adjacent the emission surface 136 of the insert 132. In this embodiment the passages 140 are generally parallel to the longitudinal axis 106 of the electrode 100. Alternatively, the passages 140 could be oriented at an angle relative to the longitudinal axis 106 of the electrode 100.

Figure 6:
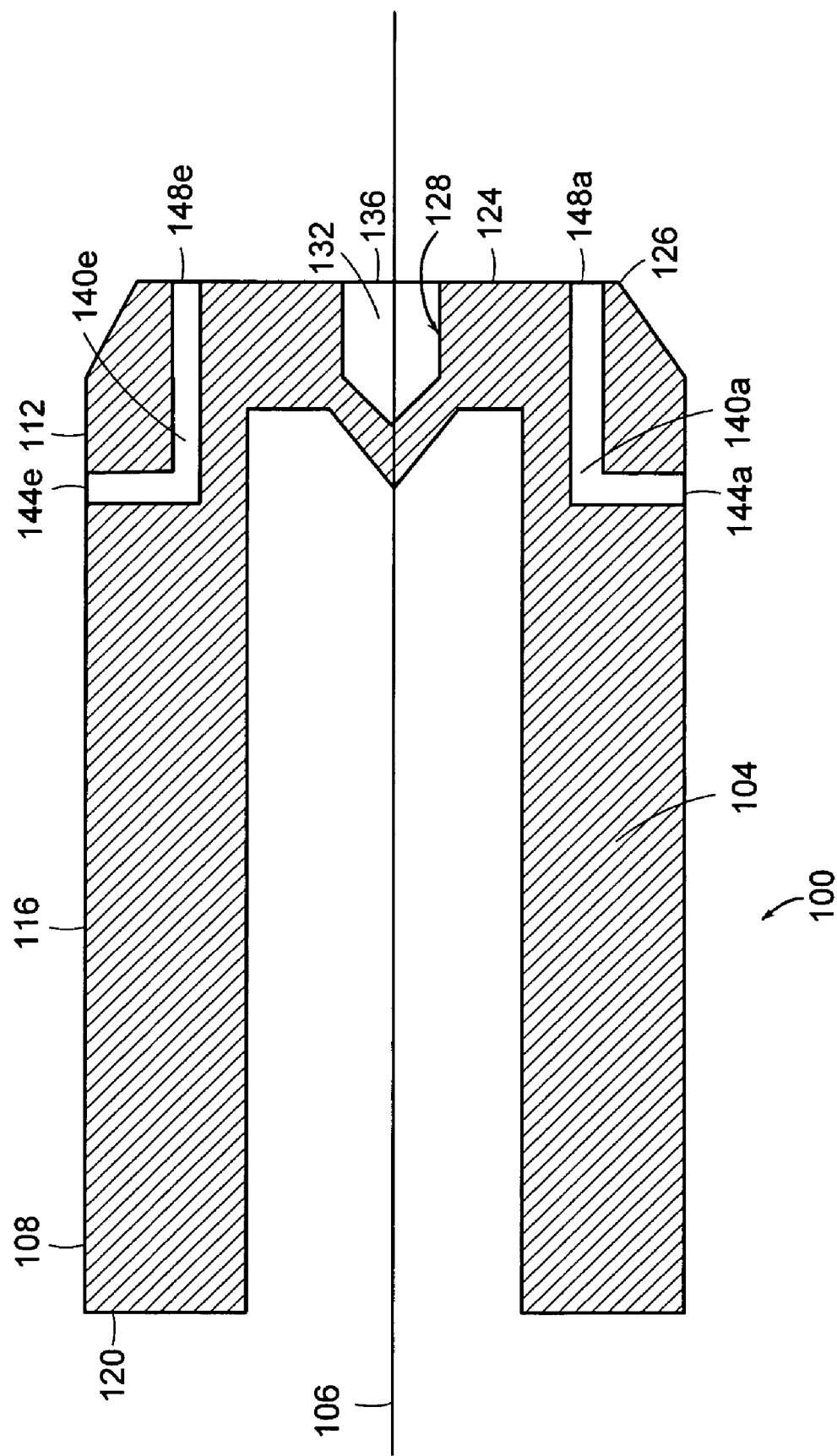
FIG. 6 is a cross-sectional view of an electrode, according to an illustrative embodiment of the invention.

In another embodiment of the invention, illustrated in FIG. 6, the electrode 100 has a plurality of passages 140 (140a and 140e shown; 140b, 140c, 140d, 140f, 140g, and 140h not shown). In this embodiment the passages 140 each have respective first openings 144 in the second end 112 of the body 104 of the electrode 100 and respective second openings 148 in the second end 112 of the body 104. The passages 140 direct a gas flow entering the first openings 144 radially towards the longitudinal axis 106 of the electrode 100 and then axially towards the second openings 148.

Figure 7:
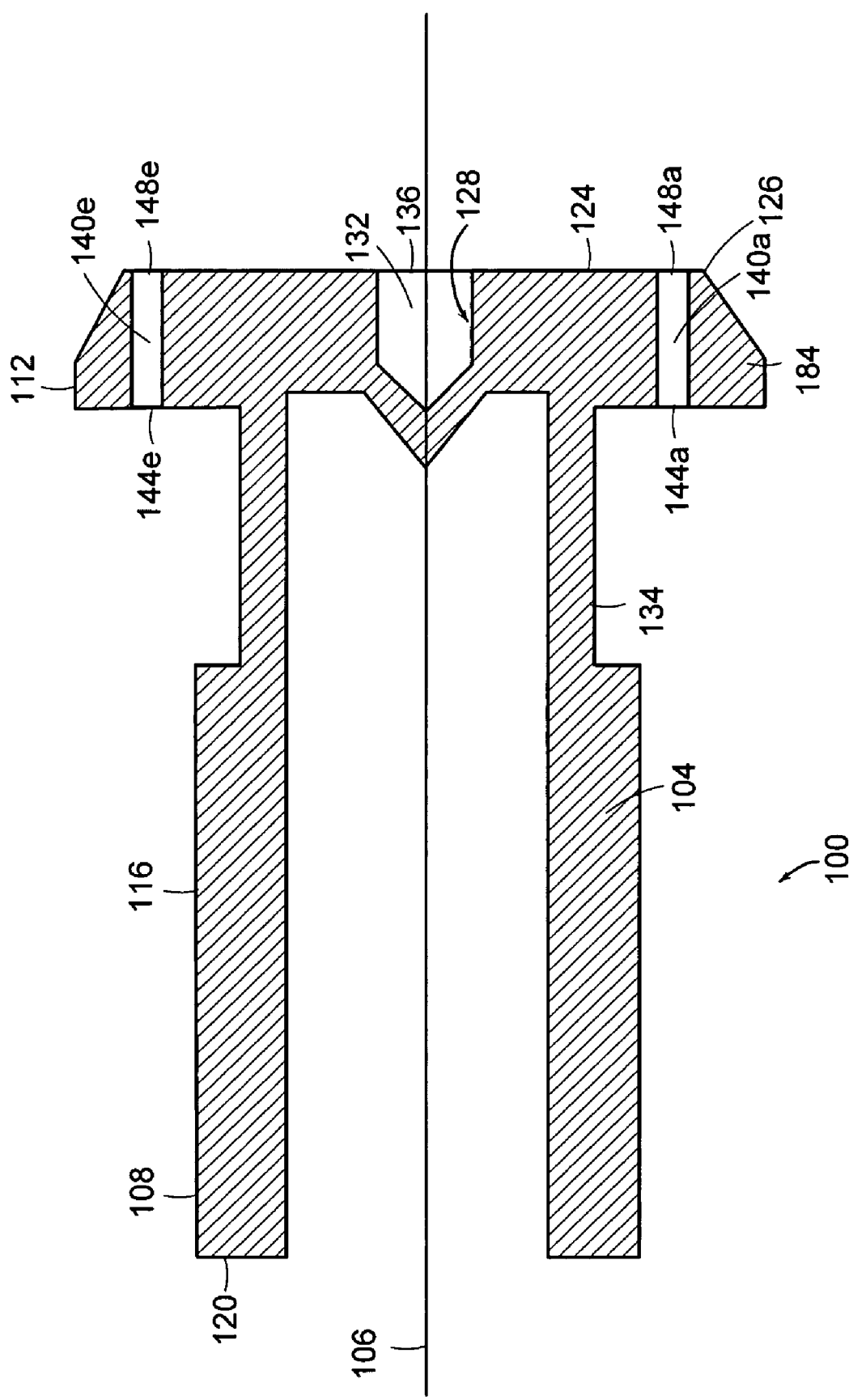
FIG. 7 is a cross-sectional view of an electrode, according to an illustrative embodiment of the invention.

In another embodiment of the invention, illustrated in FIG. 7, the electrode 100 has a flange 184 located at the second end 112 of the body 104 of the electrode 100. The body has a plurality of passages 140 (140a and 140e shown; 140b, 140c, 140d, 140f, 140g, and 140h not shown) located in the flange 184. Each of the passages 140 has respective first openings 144 and respective second openings 148 also located in the flange 184.

Figure 8:
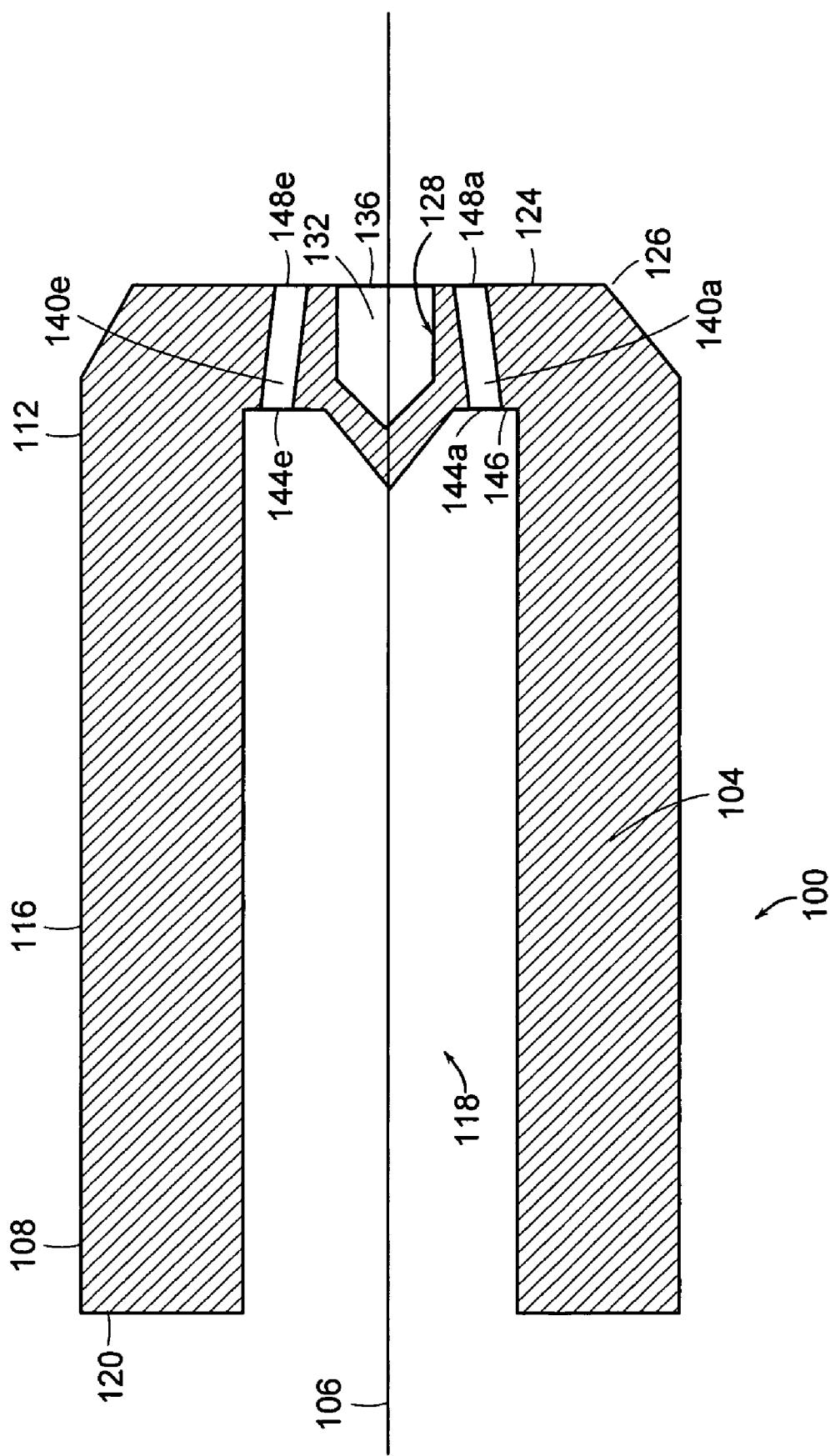
FIG. 8 is a cross-sectional view of an electrode, according to an illustrative embodiment of the invention.

In another embodiment of the invention, illustrated in FIG. 8, the electrode 100 has a plurality of passages 140 (140a and 140e shown; 140b, 140c, 140d, 140f, 140g, and 140h not shown). The electrode 100 has a hollow interior 118 adjacent an inner surface 146 of the second end 112 of the body 104 of the electrode 100. The passages 140 each extend from respective first openings 144 in the inner surface 146 of the second end 112 of the body 104 to respective second openings 148 in the end face 124 of the second end 112 of the body 104.

Figure 9:
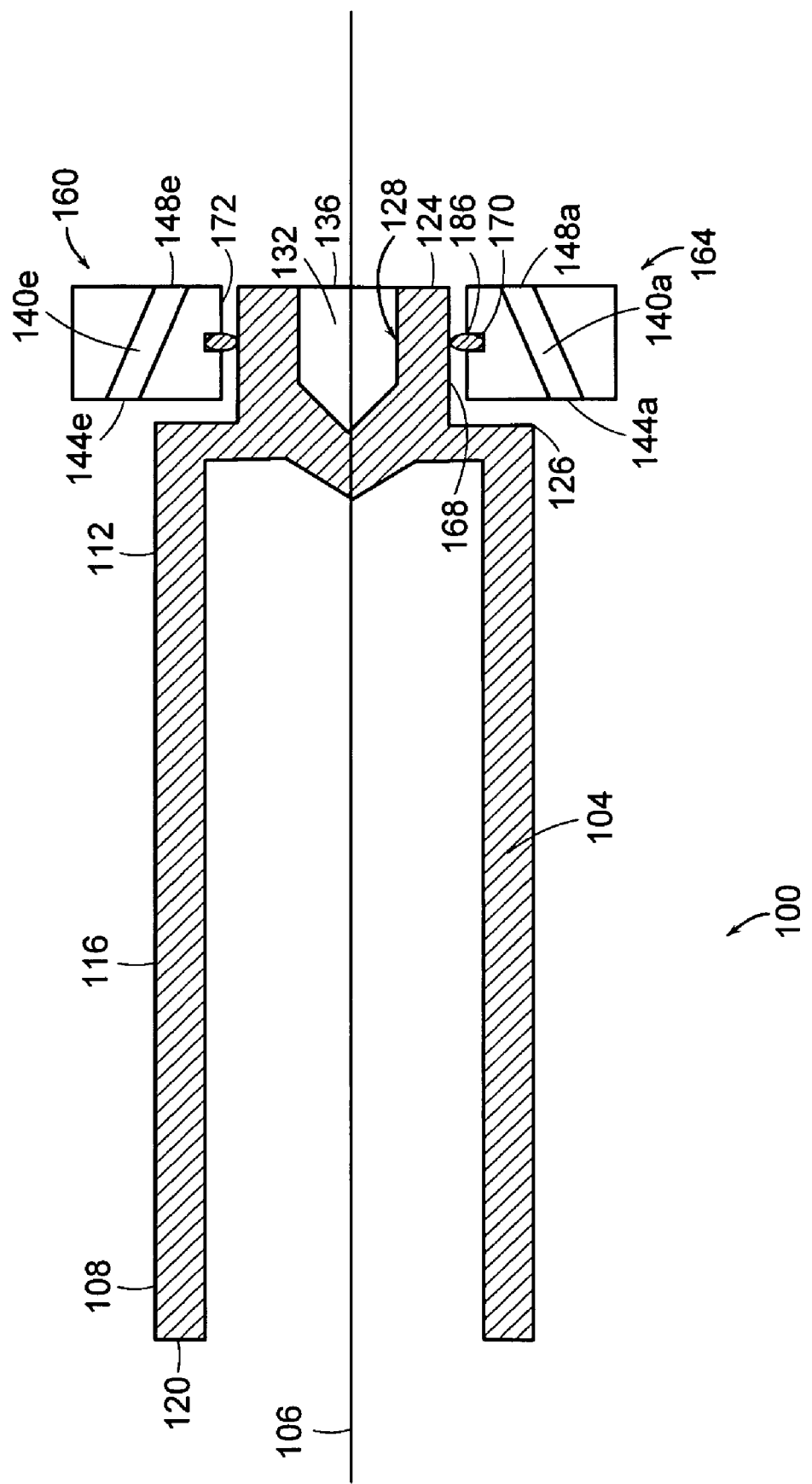
FIG. 9 is a cross-sectional view of an electrode, according to an illustrative embodiment of the invention.

In another embodiment, illustrated in FIG. 9, the electrode 100 has a generally cylindrical elongated body 104 formed of a high thermal conductivity material. The electrode body 104 extends along a longitudinal axis 106 of the electrode 100. The second end 112 of the body 104 of the electrode 100 has a location 168 (e.g., a shoulder) of reduced diameter relative to the outer surface 116 at the first end 108 of the body 104. The electrode 100 also has a component 160 that has two passages 140 (140a and 140e). Alternative numbers and geometries of passages 140 are within the scope of the invention. The component 160 has a generally cylindrical body 164 that extends along the longitudinal axis 106 of the electrode 100. The component 160 has a central hole 172 that also extends along the common longitudinal axis 106. The passages 140a and 140e each extend through the body 164 of the component 160 from first openings 144 (144a and 144e, respectively) to second openings 148 (148a and 148e, respectively). In a similar manner as described previously herein, a gas flow is directed through the passages 140 to a location adjacent the insert 132 which is located in the bore 128 of the electrode 100.

In this embodiment, the component 160 has an annular groove 170 located on an inner surface 176 within the hole 172 of the component 160. An o-ring 186 is located partially within the groove 172. When assembled, the o-ring 186 is partially in contact with the location 168 of the body 104 of the electrode 100. In this manner, the component 160 is coupled via the o-ring 186 to the location 168 of the body 104 of the electrode 100.

By way of example, the component 160 can be formed of a high thermal conductivity material (e.g., copper). In some embodiments, the component 160 may be formed from a ceramic, composite, plastic or metal material. In some embodiments, the component 160 can be formed from one or more pieces. In some embodiments, the component 160 can be press fit or bonded to the body 104 of the electrode 100. In some embodiments, the component 160 is not in contact with the electrode 100 and is instead, for example, coupled to a nozzle (not shown) of the torch in a position adjacent to the second end 112 of the electrode 100. In this manner, the component 160 is still able to direct a flow of gas to a location adjacent to the insert 132 of the electrode 100. In some embodiments, the component 160 is coupled to a torch body (not shown) of the torch. The passages 140 that are formed in the component 160 direct a flow of gas to a location adjacent to the insert 132 of the electrode 100. The second openings 148 impart at least an axial velocity component to a gas flow out of the passages 140.

In some embodiments, the passages 140 are formed in a nozzle (not shown) of the torch and the second openings 148 are located adjacent the second end 112 of the electrode. In this manner, the passages 140 direct a flow of gas to a location adjacent the insert 132 of the electrode 100. In other embodiments, the passages 140 are formed in a torch body and direct a flow of gas to a location adjacent to the insert 132 of the electrode 100.

Figure 10:
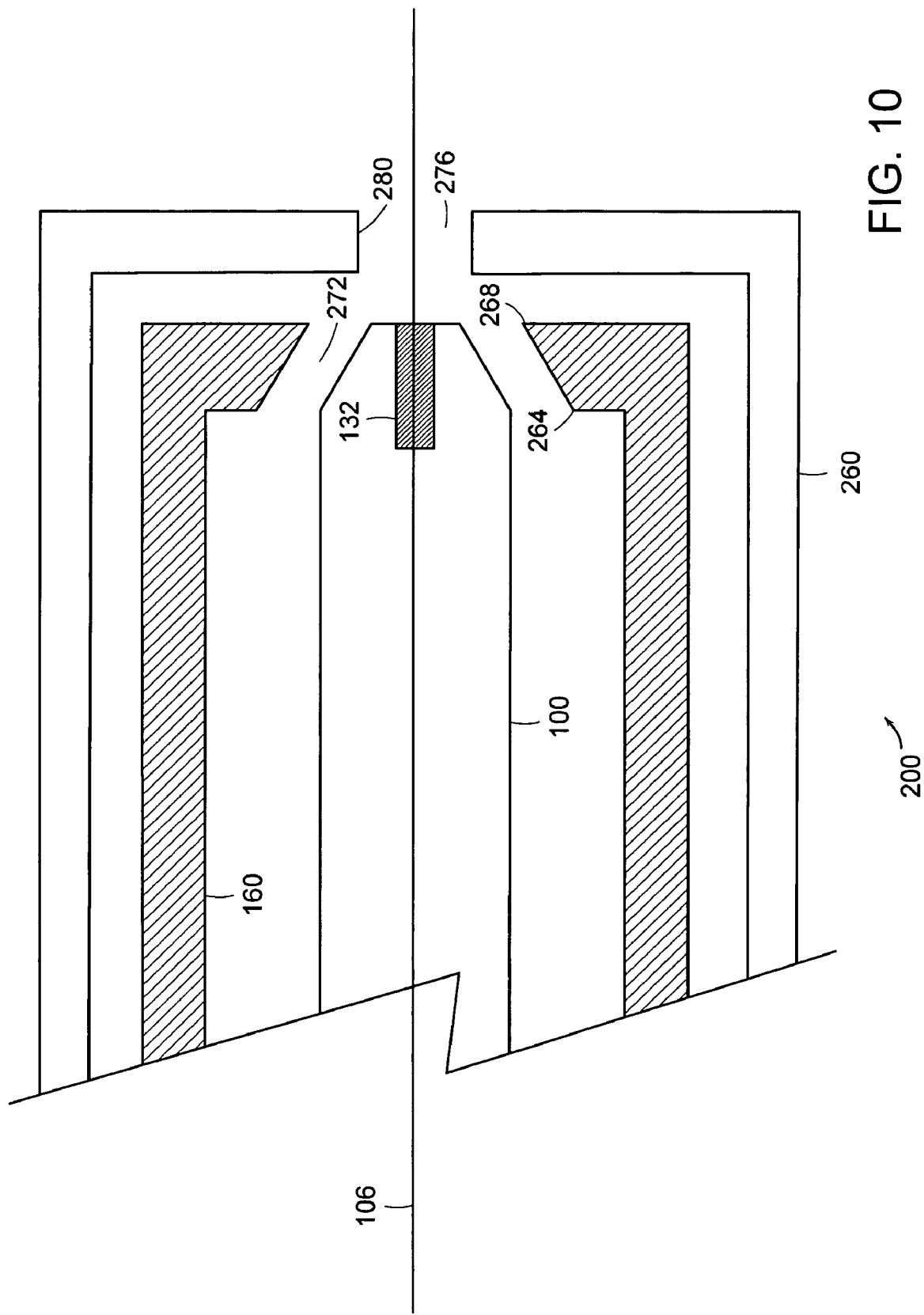
FIG. 10 is a partial cross-section of an assembly for use in a plasma arc torch incorporating principles of the present invention.

FIG. 10 is an illustration of an assembly 200 for use in a plasma arc torch employing the principles of the present invention. The assembly 200 includes a nozzle 260 mounted in a torch body of a torch (not shown). The nozzle 260 has an exit orifice 280. The assembly 200 also includes an electrode 100 mounted in the torch body. The electrode 100 includes an insert 132 that is press fit into a bore of the electrode 100. The assembly 200 also includes a component 160 mounted in the torch body relative to the nozzle 260.

The component 160 defines at least one passage 272. The passage 272 has a first opening 264 and a second opening 268. In this embodiment, the passage 272 is a tapered orifice, tapering from the first opening 264 towards the second opening 268. The passage 272 directs a flow of gas from the first opening 264 toward the second opening 268 to a location adjacent the insert 132 of the electrode 100. In this embodiment, the nozzle 260, component 160 and the electrode 100 are collinearly disposed relative to a longitudinal axis 106 such that the nozzle exit orifice 280, the passage 272, and the insert 132 of the electrode are concentric relative to each other.

Figure 11A:
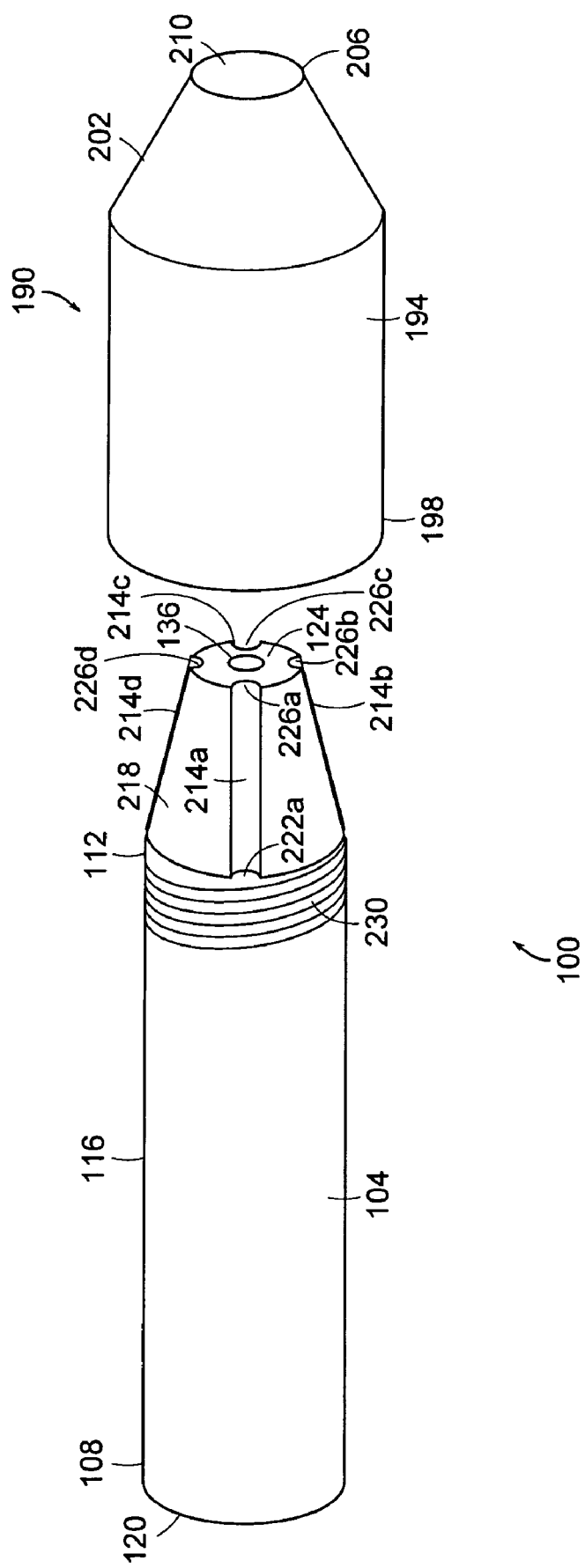
FIG. 11A is an exploded perspective view of an embodiment of an electrode according to the invention.
Figure 11B:
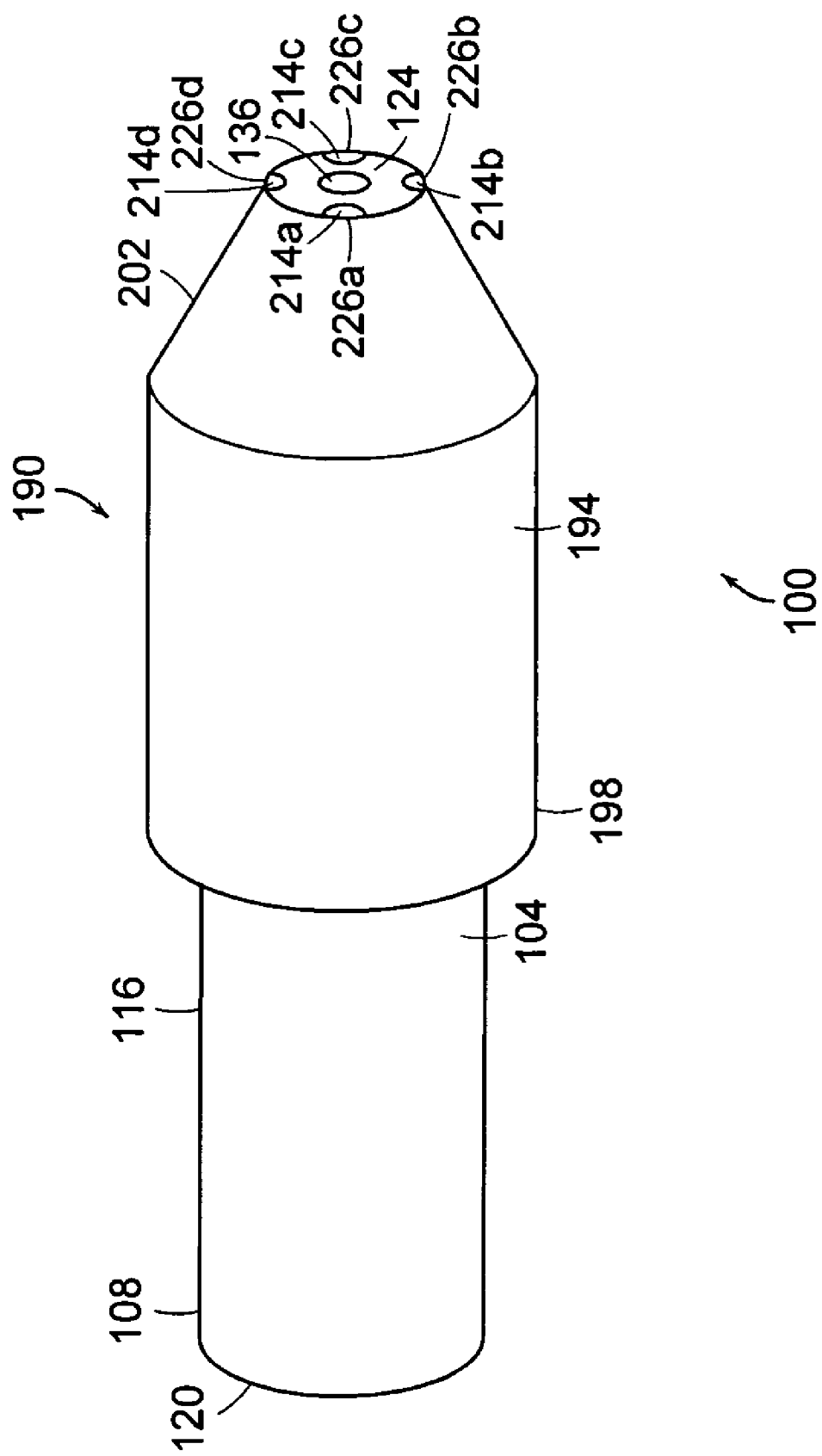
FIG. 11B is an assembly view of an embodiment of an electrode according to the invention.

In another embodiment of the invention, illustrated in FIGS. 11A and 11B, the electrode 100 is formed by joining a cap 190 to a body 104. The cap 190 has a generally cylindrical body 194. The body 194 has a first end 198 defining a first opening (not shown) and a second end 202 defining a second opening 206. The body 194 is a hollow body with a passage 210 extending from the first opening (not shown) to the second opening 206. By way of example, the cap 190 may be formed of a high temperature material (e.g., graphite) or a high thermal conductivity material (e.g., copper). In this embodiment, the cap 190 also has a series of threads (not shown) located on a portion of the walls of the passage 210 of the cap 190.

Referring to FIG. 11A, the body 104 of the electrode 100 has four channels, 214a, 214b, 214c and 214d (generally 214) on an outer surface 218 of the second end 112 of the body 104 of the electrode 100. In this embodiment the channels 214 have the shape of a section of a circle when viewed from the end face 124 of the second end 112 of the body 104. The channels 214 can have, alternatively, a different shape when viewed from the end face 124 of the second end 112 of the body 104. For example, the channels 214 can have the shape of a triangle, a section of a square, or a section of an ellipse when viewed from the end face 124. The channels 214a, 214b, 214c and 214d each have a first opening 222a, 222b, 222c and 222d (generally 222), respectively. For clarity of illustration, the openings 222b, 222c and 222d are not shown. The first openings 222 are located at the second end 112 of the body. The channels 214a, 214b, 214c and 214d also each have a second opening 226a, 226b, 226c and 226d (generally 226), respectively. The second openings 226 are located in the end face 124 of the second end 112 of the body 104 of the electrode 100. The body 104 has a series of threads 230 on the outer surface 116 of the body 104. The threads 230 are located adjacent the second end 112 of the body 104. The threads 230 are capable of mating with the threads located on the wall of the passage 210 of the cap 190.

Referring to FIG. 11B, the cap 190 is screwed onto the second end 112 of the body 104 in such a way as to secure the cap 190 to the body 104 by the union of the threads 230 on the body 104 with mating threads on the wall of the passage 210 of the cap 190. The cap 190 and body 104 are dimensioned such that a planar surface defined by the end face 124 of the body 104 is generally coplanar with a plane defined by the opening 206 of the cap 190. By joining the cap 190 to the body 104, passages are created in the electrode 100. The passages are substantially similar to, for example, the passages 140 of FIGS. 3A and 3B.

Figure 12:
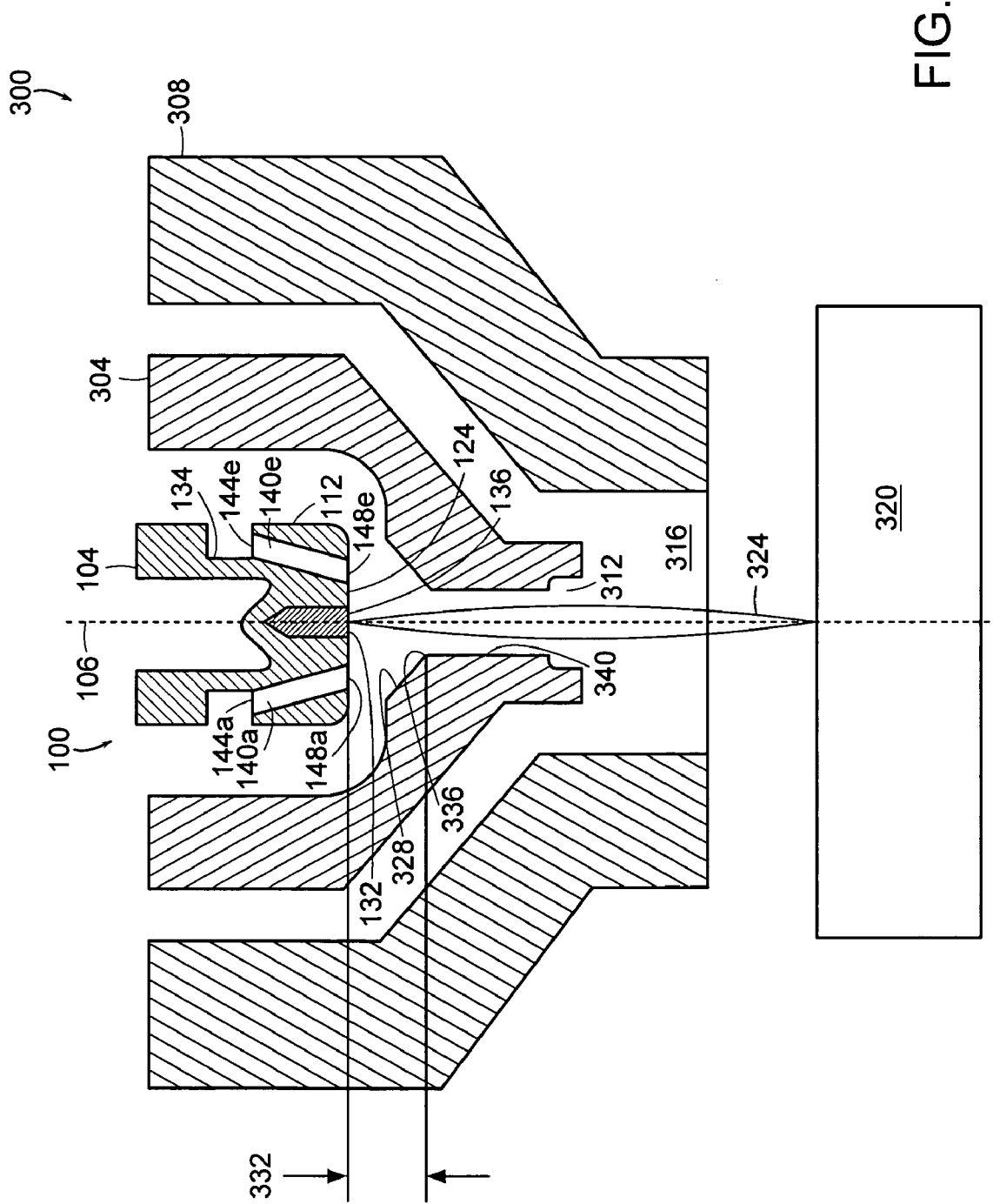
FIG. 12 is a simplified cross-sectional view of an electrode and a nozzle installed in a torch tip, according to an illustrative embodiment of the invention.

FIG. 12 is an illustration of a plasma arc torch tip 300 employing the principles of the present invention in the transferred arc mode of a plasma arc torch. This mode is characterized by the emission of a transferred plasma arc 324 from the emission surface 136 of an insert 132 of an electrode, such as the electrode 100 of FIGS. 3A and 3B, to a workpiece 320. The plasma arc 324 passes through an exit orifice 312 of a nozzle 304 and a shield orifice 316 of a shield 308 to make electrical contact with the workpiece 320. The nozzle 304, the shield 308, and the electrode 100 are collinearly disposed relative to a longitudinal axis 106 such that the nozzle exit orifice 312, the shield orifice 316, and the emission surface 136 of the insert 132 located in the electrode 100 are concentric relative to each other.

With reference to FIG. 12, the electrode 100 has eight passages 140 (140a and 140e shown; 140b, 140c, 140d, 140f, 140g and 140h not shown) in the body 104 of the electrode 100. Each passage 140 has a respective first opening 144 in the body 104 and a respective second opening 148 in the second end 112 of the body 104 of the electrode 100. The passages 140 facilitate the flow of gas through the body 104 of the electrode 100 to a location adjacent the emission surface 136 of the insert 132. In this embodiment, the gas flow is directed substantially towards the plasma arc 324 rather than towards an inside wall 328 of the nozzle 304. The gas flow is directed into an opening 336 in the nozzle 304 and out of the nozzle exit orifice 312.

It has been determined that the gas flowing out of the passages 140 increases the axial momentum of the plasma arc 324. Increasing the axial momentum of the plasma arc 324 has been shown to promote faster cutting and better cut quality. Accordingly, in some embodiments, various parameters (e.g., passage shape and quantity, and gas flow rate) associated with the invention are selected to increase the axial momentum of the gas flowing out of the passages 140. For example, in some embodiments, the number of passages 140 and the location of the second openings 148 are selected to increase the axial momentum of the plasma arc 324. In this manner, an operator may, for example, increase the speed at which the plasma torch is used to cut a piece of metal while maintaining and/or improving cut quality.

A nozzle-electrode gap 332 between the end face 124 of the electrode 100 and the entrance 336 of the nozzle orifice 340 can be selected, for example, to increase electrode life, improve cut quality and/or reduce wear of the bore of the nozzle. By way of illustration, an experiment was conducted to demonstrate the effects of varying the length of the nozzle-electrode gap 332. Eight passages 140 were formed in the body of an electrode, for example, the electrode 100 of FIGS. 3A and 3B. The passages 140 each had a diameter of about 1.04 mm located at an angle of about 22° relative to the longitudinal axis 106 of the electrode 100. In operation in a torch, for equivalent operating conditions, a nozzle-electrode gap 332 of about 3.0 mm exhibited improved cut quality relative to a nozzle-electrode gap 332 of about 3.8 mm. In another experiment, for equivalent operating conditions, nozzle-electrode gaps of about 3.0 mm and about 3.8 mm exhibited less nozzle bore wear and longer electrode life relative to a nozzle-electrode gap 332 of about 2.3 mm.

Figure 13:
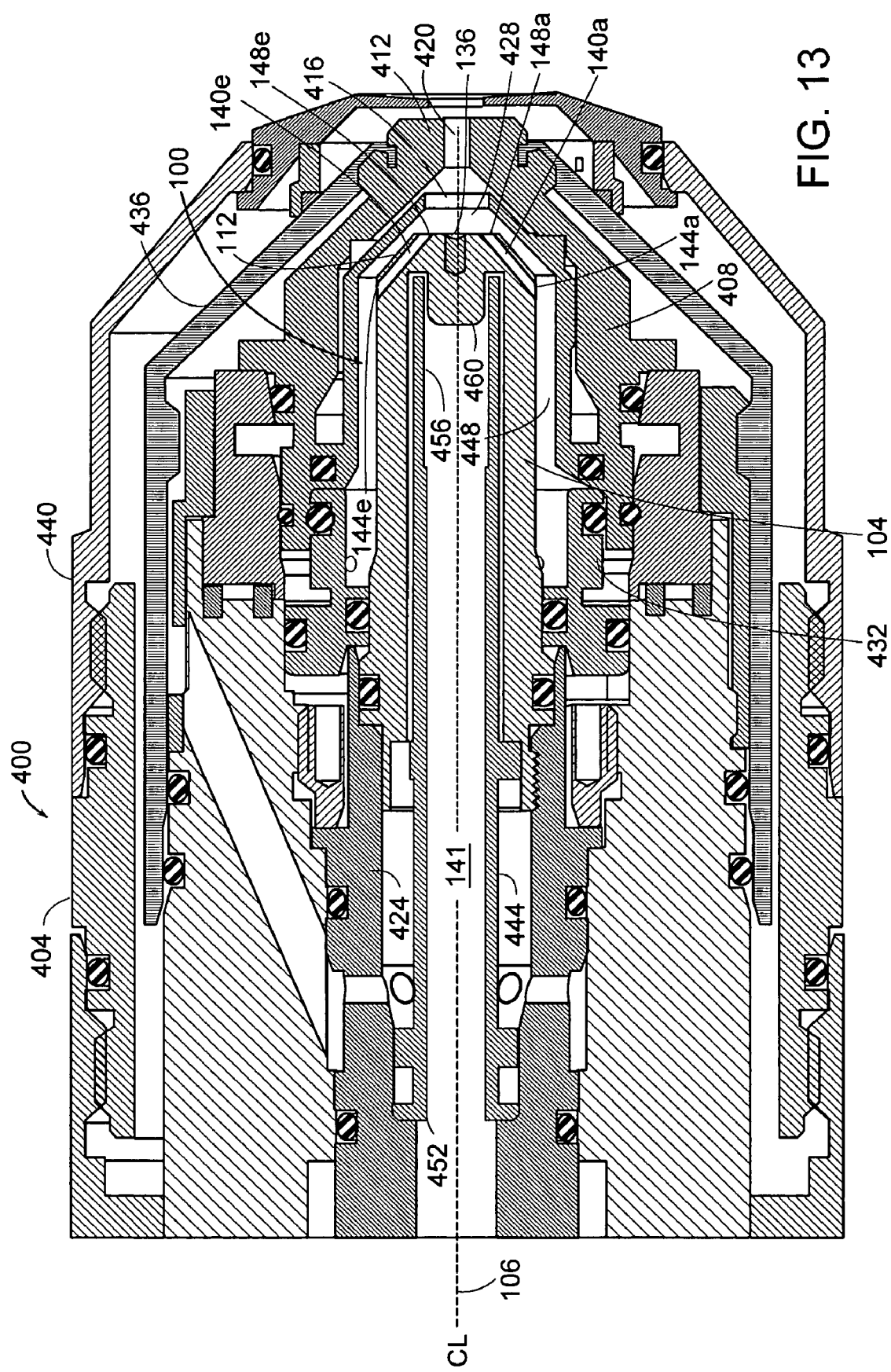
FIG. 13 is a partial cross-section of a plasma arc torch incorporating an electrode of the invention.

FIG. 13 shows a portion of a high-definition plasma arc torch 400 that can be utilized to practice the invention. The torch 400 has a generally cylindrical body 404 that includes electrical connections, passages for cooling fluids and arc control fluids. An anode block 408 is secured in the body 404. A nozzle 412 is secured in the anode block 408 and has a central passage 416 and an exit passage 420 through which an arc can transfer to a workpiece (not shown). An electrode, such as the electrode 100 of FIGS. 3A and 3B, is secured in a cathode block 424 in a spaced relationship relative to the nozzle 412 to define a plasma chamber 428. Plasma gas fed from a swirl ring 432 is ionized in the plasma chamber 428 to form an arc. A water-cooled cap 436 is threaded onto the lower end of the anode block 408, and a secondary cap 440 is threaded onto the torch body 404. The secondary cap 440 acts as a mechanical shield against splattered metal during piercing or cutting operations.

A coolant tube 444 is disposed in the hollow interior 448 of the electrode 100. The tube 444 extends along a centerline or longitudinal axis 106 of the electrode 100 and the torch 400 when the electrode 100 is installed in the torch 400. The tube 444 is located within the cathode block 424 so that the tube 444 is generally free to move along the direction of the longitudinal axis 106 of the torch 400. A top end 452 of the tube 444 is in fluid communication with a coolant supply (not shown). The flow of coolant travels through the passage 141 and exits an opening located at a second end 456 of the tube 444. The coolant impinges upon the interior surface 460 of the second end 112 of the electrode 100 and circulates along the interior surface of the electrode body 104.

In operation, a flow of gas is directed into the first openings 144 located in the body 104 of the electrode 100, along the passages 140, and out of the second openings 148 located in the second end 112 of the body 104 of the electrode 100. The gas flows out of the second openings 148 adjacent the emission surface 132 of an emission insert. The flow of gas is directed towards the plasma arc (not shown) and through the central passage 416 and the exit passage 420 of the nozzle 412 and through an exit orifice of a shield towards the workpiece (not shown).

Variations, modifications, and other implementations of what is described herein will occur to those of ordinary skill without departing from the spirit and the scope of the invention. Accordingly, the invention is not to be defined only by the preceding illustrative description.

What is claimed is:

1. An electrode for a plasma arc torch, the electrode comprising:
    a body having a first end and a second end in a spaced relationship relative to the first end, the body having an end face disposed at the second end, the end face defining an edge, wherein during operation a first gas flow flowing about the body, from the first end to the second end;
    an insert with an emission surface, the insert disposed in the second end of the body, the insert defining a perimeter, wherein during operation of the electrode a plasma arc emission is confined within the perimeter of the insert; and
    at least one passage extending through the body, the at least one passage dimensioned to divert a first portion of the first gas flow to create a second gas flow, the second gas flow flowing from a first opening adjacent the second end of the body and exiting a second opening in the end face of the second end of the body, the second opening being located between the perimeter and the edge, wherein during operation a second portion of the first gas flow flowing outside the edge.

2. An electrode for a plasma arc torch, the electrode comprising:
    a body having a first end, a second end in a spaced relationship relative to the first end, and an outer surface extending from the first end to the second end, the body having an end face disposed at the second end, the end face defining an edge, wherein during operation of the electrode, a swirling gas flow flowing about the body, from the first end to the second end of the body;
    an insert with an emission surface, the insert disposed in the second end of the body, the insert defining a perimeter, wherein during operation of the electrode a plasma arc emission is confined within the perimeter of the insert; and at least one axially and radially directed passage formed in the body extending from a first opening in the outer surface of the body to a second opening in the end face of the second end of the body, second opening being inside the edge and outside the perimeter, the at least one passage is dimensioned to direct a second gas flow to exit the second opening, wherein during operation of the electrode the swirling gas flow flowing outside the edge.

3. An electrode for a plasma arc torch, the electrode comprising:

a body having a first end, a second end in a spaced relationship relative to the first end, an end face disposed at the second end, the end face defining an edge, and an outer surface extending from the first end to the second end, the body defining a bore disposed in the second end of the body;

an insert with an emission surface, the insert disposed in the bore, the insert defining a perimeter, wherein during operation of the electrode a plasma arc emission is confined within the perimeter of the insert; and at least one passage extending from a first opening in the body to a second opening adjacent the bore in the second end of the body, wherein the second opening is located between the edge and the perimeter and is substantially coplanar with the emission surface of the insert.

4. A plasma arc torch for marking or cutting a workpiece, the plasma arc torch comprising:

a torch body including a plasma flow path for directing a plasma gas to a plasma chamber in which a plasma arc is formed; and an electrode mounted in the torch body, the electrode comprising an electrode body having a first end, a second end in a spaced relationship relative to the first end, an outer surface extending from the first end to the second end, and at least one passage, the electrode body having an end face disposed at the second end of the electrode body, the end face defining an edge, wherein during operation of the plasma arc torch, a swirling gas flow flowing about the body, from the first end to the second end, an insert with an emission surface, the insert disposed in the second end of the electrode body, the insert defining a perimeter, wherein during operation of the electrode a plasma arc emission is confined within the perimeter, and the at least one passage extending from a first opening in the electrode body to a second opening in the end face at the second end of the electrode body, wherein the at least one passage is dimensioned to divert a first portion of the swirling gas flow to create a second gas flow that enters the first opening and exits the second opening, the second opening being between the perimeter and the edge, wherein during operation of the plasma arc torch a second portion of the swirling gas flow flowing outside the edge.

5. The plasma arc torch of claim 4, comprising a nozzle mounted relative to the electrode in the torch body to define the plasma chamber.

6. The plasma arc torch of claim 4, wherein the at least one passage is located at an acute angle relative to a longitudinal axis of the electrode body.

7. The plasma arc torch of claim 4, comprising a cap located at the second end of the electrode body, wherein the at least one passage is defined by the cap and the electrode body.

8. The plasma arc torch of claim 4, wherein the electrode body comprises at least two components that form the at least one passage when the at least two components are assembled.

9. The plasma arc torch of claim 4, wherein the at least one passage is a plurality of passages.

10. The plasma arc torch of claim 9, wherein the plurality of passages are mutually equally angularly spaced around a diameter of the electrode body.

11. The plasma arc torch of claim 9, wherein the plurality of passages each extend from a respective first opening in the electrode body to a respective second opening in the second end of the electrode body.

12. A plasma arc torch component configured to operate in conjunction with a generally elongated electrode having an insert in one end thereof, the insert defining a perimeter and having an emission surface for emitting a plasma arc, such that during operation of the electrode a plasma arc emission is substantially confined within the perimeter of the insert, the component comprising:

a body having a first end and a second end, and an outer surface extending from the first end to the second end, the second end having an end face, the end face defining an edge, at least one passage extending through the body and having a first opening and a second opening, the second opening located outside the perimeter and inside the edge, wherein during operation a swirling first gas flow flows about the outer surface and outside the edge and a second gas flow flows through the at least one passage.

13. The component of claim 12 wherein the at least one passage is a tapered orifice.

14. The component of claim 12 comprising a nozzle mounted relative to the body and the electrode in a torch body.

15. A torch tip for a plasma arc torch, the plasma arc torch having a hollow torch body which includes a plasma chamber in which a plasma arc is formed, the torch tip comprising:

a nozzle having an interior surface; and an electrode mounted relative to the nozzle in the torch body to define the plasma chamber, the electrode comprising an electrode body having a first end, a second end in a spaced relationship relative to the first end, an outer surface extending from the first end to the second end to allow a swirling gas flow between the electrode body and the interior surface of the nozzle, and at least one passage for diverting a first portion of the swirling gas flow to create a second gas flow through the body of the electrode, the electrode body having an end face at the second end of the electrode body, the end face defining an edge, an insert with an emission surface, the insert disposed in the second end of the electrode body, the insert defining a perimeter wherein during operation of the torch tip a plasma arc emission is confined within the perimeter, and the at least one passage extending from a first opening in the electrode body to a second opening in the end face at the second end of the electrode body, the second opening being inside the edge and outside the perimeter, the second opening is positioned to direct the second gas flow to exit the second opening substantially adjacent the insert, the interior surface of the nozzle is positioned to direct a second portion of the swirling gas flow flowing outside the edge.

16. The torch tip of claim 15, comprising a shield.

17. An electrode for a plasma arc torch, the electrode comprising:
- a body having a first end, a second end in a spaced relationship relative to the first end, and an outer surface extending from the first end to the second end, the body having an end face disposed at the second end, the end face defining an edge;
- an insert with an emission surface, the insert disposed at the second end of the body, the insert defining a perimeter, wherein during operation of the electrode a plasma arc emission is confined within the perimeter of the insert; and
- at least one passage extending through the body from a first opening in the body to a second opening in the end face, wherein the at least one passage is dimensioned to divert a first portion of a swirling gas flow to create a second gas flow that enters the first opening and exits the second opening, the second opening being located between the perimeter and the edge, wherein during operation of the electrode the second portion of the swirling gas flow flowing adjacent the edge and radially outward of the second opening.

18. The electrode of claim 17 wherein the at least one passage is dimensioned to direct the second gas flow comprising an axial velocity component to exit the second opening.

19. The electrode of claim 17 wherein the at least one passage is dimensioned to direct the second gas flow comprising one or more of axial, radial, and tangential velocity components to exit the second opening.

20. The electrode of claim 17 wherein the swirling gas flow and the second gas flow are supplied by the same gas source.

21. The electrode of claim 17 wherein the swirling gas flow comprises a swirl strength and the at least one passage is dimensioned to direct the second gas flow to exit the second opening with an axial velocity component that effects the swirl strength of the first gas flow.

22. The electrode of claim 17 wherein the second gas flow comprises a non-oxidizing gas.

23. An electrode for a plasma arc torch, the electrode comprising:
- a body having a first end, a second end in a spaced relationship relative to the first end, and an outer surface extending from the first end to the second end wherein during operation of the electrode a swirling gas flow flowing about the outer surface, the body having an end face disposed at the second end, the end face defining an edge;
- an insert with an emission surface, the insert disposed in the second end of the body, the insert defining a perimeter, wherein during operation of the electrode a plasma arc emission is confined within the perimeter of the insert; and
- at least one passage extending through the body from a first opening in the body to a second opening in the end face, the at least one passage is dimensioned to divert a first portion of the swirling gas flow to create a second gas flow that enters the first opening and exits the second opening, the second opening located between the perimeter and the edge.

24. The electrode of claim 23 wherein the at least one passage is dimensioned to direct the second gas flow to exit the second opening with one or more of axial, radial, and tangential velocity components.

25. The electrode of claim 23 wherein the swirling gas flow and the second gas flow are supplied by the same gas source.

26. The electrode of claim 23 wherein the second gas flow comprises an axial velocity component.

27. The electrode of claim 23 wherein the at least one passage is dimensioned to direct the second gas flow to exit the second opening with an axial velocity component.

28. The electrode of claim 23 wherein the at least one passage is dimensioned to direct the second gas flow to exit the second opening with an axial velocity component that effects the swirl strength of the swirling gas flow.

29. The electrode of claim 23 wherein the second gas flow comprises a non-oxidizing gas.

30. An electrode for a plasma arc torch, the electrode comprising:
- a body having a first end, a second end in a spaced relationship relative to the first end, and an outer surface extending from the first end to the second end, the body having an end face disposed at the second end, the end face defining an edge;
- an insert made of an emissive material and defining a perimeter, wherein during operation a plasma arc emission is confined within the perimeter, the insert disposed in the second end of the body, wherein the emissive material is ejected due to use over time; and
- means for providing a second gas flow located between the perimeter and the edge to reduce the ejection of emissive material by reducing the swirl strength of a first gas flow in the region of the plasma arc emission.

* * * * *

UNITED STATES PATENT AND TRADEMARK OFFICE
CERTIFICATE OF CORRECTION

PATENT NO. : 7,375,302 B2  Page 1 of 1
APPLICATION NO. : 10/989729
DATED : May 20, 2008
INVENTOR(S) : Twarog et al.

It is certified that error appears in the above-identified patent and that said Letters Patent is hereby corrected as shown below:

On the face of the patent, under Inventors, in *field number* 75, please delete "NH" and insert -- VT -- before David J. Cook's name.

In claim 4, column 15, line 51, please delete "and"

Signed and Sealed this

Nineteenth Day of August, 2008

JON W. DUDAS
*Director of the United States Patent and Trademark Office*